United States Patent
Wang et al.

(10) Patent No.: US 10,845,995 B2
(45) Date of Patent: Nov. 24, 2020

(54) TECHNIQUES TO CONTROL AN INSERTION RATIO FOR A CACHE

(71) Applicant: Intel Corporation, Santa Clara, CA (US)

(72) Inventors: Yipeng Wang, Hillsboro, OR (US); Ren Wang, Portland, OR (US); Sameh Gobriel, Hillsboro, OR (US); Tsung-Yuan Charlie Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 15/639,821

(22) Filed: Jun. 30, 2017

(65) Prior Publication Data
US 2019/0004709 A1 Jan. 3, 2019

(51) Int. Cl.
*G06F 3/06* (2006.01)
*G06F 12/128* (2016.01)
*H04L 12/747* (2013.01)
*G06F 12/0875* (2016.01)
*G06F 12/0813* (2016.01)

(52) U.S. Cl.
CPC ............ *G06F 3/0611* (2013.01); *G06F 3/067* (2013.01); *G06F 3/0607* (2013.01); *G06F 3/0613* (2013.01); *G06F 3/0635* (2013.01); *G06F 12/0875* (2013.01); *G06F 12/128* (2013.01); *H04L 45/742* (2013.01); *G06F 12/0813* (2013.01); *G06F 2212/1016* (2013.01); *G06F 2212/154* (2013.01); *G06F 2212/502* (2013.01)

(58) Field of Classification Search
CPC .... G06F 3/0611; G06F 3/0607; G06F 3/0613; G06F 3/0635; G06F 3/067; G06F 12/126; G06F 12/127; G06F 12/128; G06F 2212/602; G06F 2212/6024; G06F 2212/50; G06F 2212/502; G06F 2212/507
See application file for complete search history.

(56) References Cited

U.S. PATENT DOCUMENTS

| | | | | |
|---|---|---|---|---|
| 8,443,151 | B2* | 5/2013 | Tang | G06F 12/0862 711/137 |
| 8,694,728 | B2* | 4/2014 | Waldspurger | G06F 11/3471 711/118 |
| 9,047,225 | B1* | 6/2015 | Evans | G06F 12/127 |
| 10,007,616 | B1* | 6/2018 | Feero | G06F 9/3802 |
| 10,705,958 | B2* | 7/2020 | Boyer | G06F 11/3037 |
| 2004/0098541 | A1* | 5/2004 | Megiddo | G06F 12/122 711/129 |

OTHER PUBLICATIONS

E. A. Leon, K. B. Ferreira and A. B. Maccabe, "Reducing the Impact of the MemoryWall for I/O Using Cache Injection," 15th Annual IEEE Symposium on High-Performance Interconnects (HOTI 2007), Stanford, CA, 2007, pp. 143-150, doi: 10.1109/HOTI.2007.8. (Year: 2007).*

* cited by examiner

*Primary Examiner* — Khoa D Doan
(74) *Attorney, Agent, or Firm* — Compass IP Law PC

(57) ABSTRACT

Examples may include techniques to control an insertion ratio or rate for a cache. Examples include comparing cache miss ratios for different time intervals or windows for a cache to determine whether to adjust a cache insertion ratio that is based on a ratio of cache misses to cache insertions.

29 Claims, 11 Drawing Sheets

Scheme *600*

Code 400

```
miss[1] = new_miss_ratio
Float d_miss = miss[1] – miss[0]
IF (d_miss > 0)
   Insert_ratio = insert_ratio + step
   Prev_insert_change = INC
ELSEIF (d_miss = 0)
   Insert_ratio = insert_ratio – step
   Prev_insert_change = DEC
ELSEIF (d_miss < 0)
   IF (prev_insert_change == INC)
      Insert_ratio = insert_ratio + step
      Prev_insert_change = INC
   ELSEIF (prev_insert_change == DEC)
      Insert_ratio = insert_ratio – step
      Prev_insert_change = DEC
ENDIF
   miss[0] = miss[1]
```

*FIG. 4*

Scheme 600

Code 700

```
factor [1] = a*new_miss_ratio + b*new_latency + c*new_jitter – d*new_throughput
 Float d_factor = factor[1] – factor[0]
 IF (d_factor > 0)
    Insert_ratio = insert_ratio + step
    Prev_insert_change = INC
 ELSEIF (d_factor = 0)
    Insert_ratio = insert_ratio – step
    Prev_insert_change = DEC
 ELSEIF (d_factor < 0)
    IF (prev_insert_change == INC)
       Insert_ratio = insert_ratio + step
       Prev_insert_change = INC
    ELSEIF (prev_insert_change == DEC)
       Insert_ratio = insert_ratio – step
       Prev_insert_change = DEC
ENDIF
    factor[0] = factor[1]
```

*FIG. 7*

FLOW 900

DETERMINE, DURING A FIRST TIME INTERVAL, A FIRST CACHE MISS RATIO FOR A CACHE ARRANGED TO STORE INFORMATION USED BY PROCESSING LOGIC HOSTED BY A COMPUTING PLATFORM
902

DETERMINE, DURING A SECOND TIME INTERVAL, A SECOND CACHE MISS RATIO FOR THE CACHE
904

COMPARE THE FIRST CACHE MISS RATIO TO THE SECOND CACHE MISS RATIO TO DETERMINE WHETHER TO ADJUST A CACHE INSERTION RATIO USED FOR THE SECOND TIME INTERVAL FOR USE DURING A SUBSEQUENT TIME INTERVAL, THE CACHE INSERTION RATIO BASED ON A RATIO OF CACHE MISSES TO CACHE INSERTIONS
906

*FIG. 9*

Storage Medium 1000

*Computer Executable Instructions for 800*

FIG. 10

TECHNIQUES TO CONTROL AN INSERTION RATIO FOR A CACHE

TECHNICAL FIELD

Examples described herein are generally related to controlling an insertion ratio or rate for a cache used by processing logic or an application.

BACKGROUND

A software or a hardware cache may be a type of structure for improving performance of applications or processing logic which frequently calculate and fetch data in a network or datacenter environment. Software caches may involve caching of data in a software structure that may be beneficial when calculating and fetching data is expensive in terms of increased latency and overhead. Some popular use cases of a software cache may include a database cache or a web cache. In these use cases, caching at least some data locally or in a middle tier may improve a speed of a subsequent fetch of the same data or content. Often, for database or web cache uses, a cache may be required to handle hundreds of requests per second.

Another type of use for a software cache may be for software-based routers/switches that may be referred to as virtual routers or switches. A software cache may be implemented for use by virtual routers or switches to perform fast flow classification for packets. In general, advanced software classification methods with wildcard support may fall into two categories: (1) hash table based categories such as tuple space search; or (2) trie based categories such as Efficut. For either type of category, searching rules for each packet may involve many memory accesses and thus may be costly. In some examples, a software cache may cache recently used rules so that an incoming packet can quickly find a rule according to its packet header. For these use cases, a software cache may be able to handle millions of requests per second.

BRIEF DESCRIPTION OF THE DRAWINGS

FIG. 4 illustrates an example first code.
FIG. 7 illustrates an example second code.
FIG. 9 illustrates an example of a second logic flow.
FIG. 10 illustrates an example of a storage medium

DETAILED DESCRIPTION

Figure 1:
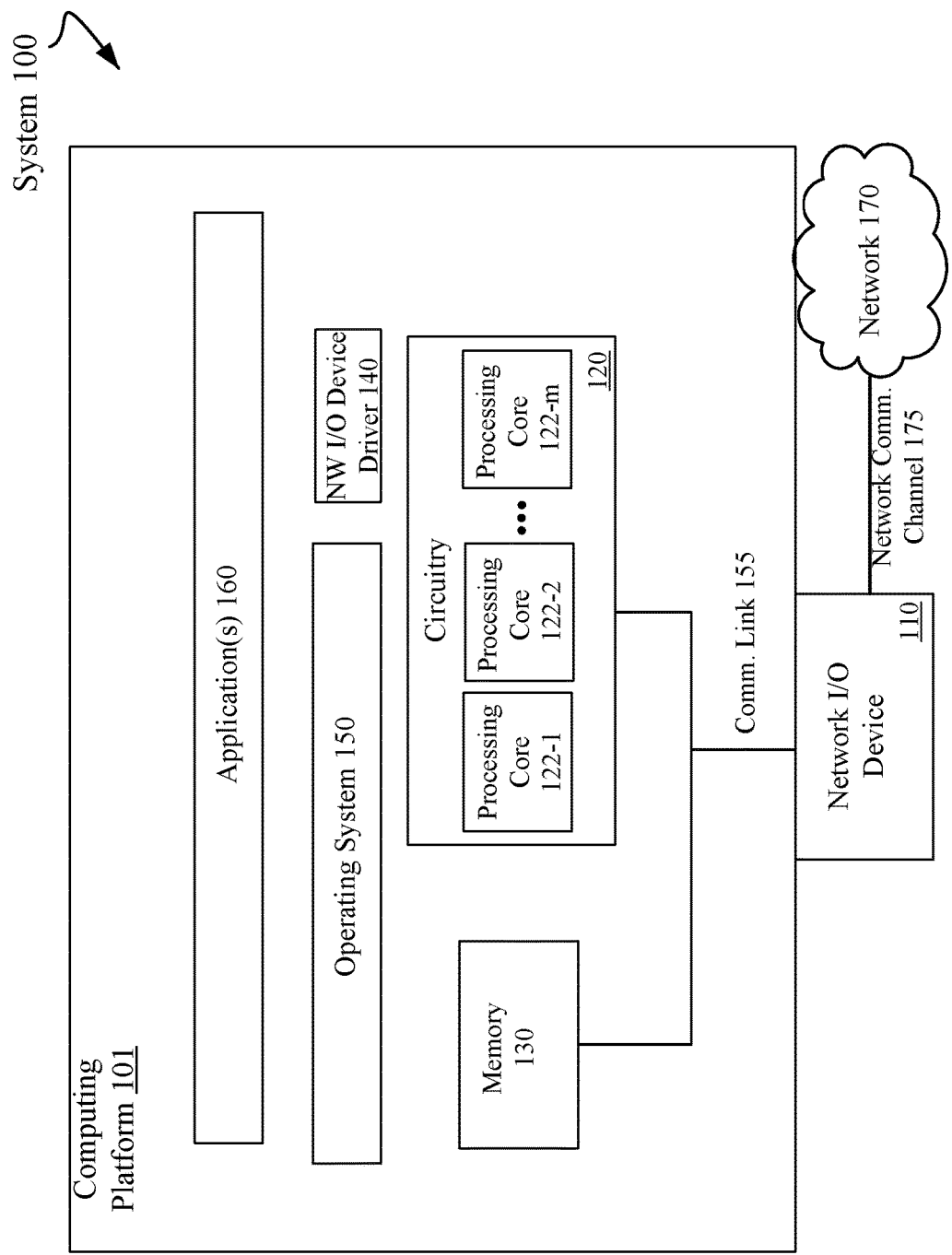
FIG. 1 illustrates an example first system.

As contemplated in the present disclosure, software or hardware cache may be a type of structure for improving performance of applications which frequently calculate and fetch data in a network or datacenter environment. Also, use cases for software caches such as use cases involving virtual routers or switches may need a software cache that can handle millions of requests per second and has a relatively low amount of cache misses to minimize harm to system performance. However, current software cache designs may have high amounts of cache misses and may unacceptably degrade system performance due these high amounts of cache misses.

According to some examples, a type of virtual switch (vSwitch) implemented as an OpenFlow switch according to one or more OpenFlow specifications may be an Open vSwitch (OvS). OvS may use an exact match cache (EMC). EMC may be a type of software cache design to cache recently used flows associated with packets routed by the OvS. For these examples, a packet may be quickly classified by EMC before going through subsequent classification via a tuple space search or a trie based search. Both the tuple space search and the trie based search cost many more processing cycles to classify the packet compared to an EMC classification, if an EMC match is made. In general, an OvS using EMC may improve throughput significantly when there is a high rate of EMC matches and a low rate of EMC misses. However, when an EMC is sized too small for a given flow's footprint associated with a work set and packet traffic does not have high locality (e.g., non-repeating or low rate of repeating traffic patterns), EMC may become a burden to a system having an OvS due to costs associated with EMC misses.

A rationale behind use of EMC by an OvS is similar to least recently used (LRU) policies that assume that a newest item will likely be accessed again in the near future. However, the insertion may be costly depending on item size and a cache miss ratio for a given work set. A situation having a high number of cache misses (possibly meaning the work set is much larger than the EMC) along with a large item size, the insertions may be too costly in terms of overhead and system throughput reductions. Overhead may be costly due to inserted items being evicted from the EMC before reuse. Throughput may be reduced due to the large item sizes that need to be continually inserted in the EMC.

In some examples, a work set may be related to a flow of packets routed by an OvS that uses an EMC. If the flow of packets does not have a traffic pattern with a high locality, EMC may become a burden to a system due to the above-mentioned costs associated with a high number of cache misses. One solution to reduce cache misses for an EMC is to enlarge a size of the EMC. This solution assumes that if one knows a flow's "footprint", one can enlarge EMC until it is able to contain all flows. Thus, no cache misses. First, this solution may be impractical in that a flow footprint may be hard to profile. Second, resizing a software cache at run-time may cause destruction of an old cache structure, rebuilding the new cache structure and copying cache content all involve a significant amount of overhead. Third, since EMC may be a less efficient memory structure compared to tuple space search or trie based search, a large EMC may quickly consume most if not all available memory resources or shared cache space, which may unacceptably harm throughput.

According to some examples, another solution for an OvS that uses EMC followed by tuple space or trie based searches may be to just turn off EMC. This solution may be practical in instances where packet traffic does not have a high locality. Lack of a high locality may cause cache miss penalties to outweigh possible EMC benefits and thus turning off EMC is practical in this situation. However, two disadvantages of turning off EMC may result. First, a certain number of flows that could have been cached via use of EMC now become equivalent to EMC misses. Second, when a flow's footprint decreases or packet traffic locality increases, there may need to be an algorithm to turn EMC back on, which requires profiling packet traffic patterns during run-time. Profiling packet traffic patterns during run-time may add an unacceptable layer of difficulty to justify turning EMC on and off.

In some examples, another solution for an OvS that uses EMC followed by tuple space or trie based searches may be to use a constant, low cache insertion rate. For example, x % of total cache misses. However, this solution assumes a constant packet traffic pattern. If packet traffic patterns change on a more frequent basis, a constant, low cache insertion rate may not be able to refresh an EMC fast enough to catch up with changing packet traffic patterns, especially when a packet traffic pattern is composed of bursts of high locality packets. For example, assuming a packet traffic pattern of 1, 1, 1, . . . 2, 2, 2, 2, . . . 2, 3, 3, 3, . . . 4, 4, . . . . If a 100% cache insertion rate (a ratio of 1) is used for an EMC, then only a first packet in a burst of same packets will cause an EMC miss. All subsequent packets will be EMC hits or matches. However, if a small % cache insertion rate is used, it is very likely that a whole burst of the same packet traffic pattern may result in EMC misses. A whole burst of the same packet traffic pattern may substantially increase a ratio of EMC misses to EMC hits.

FIG. 1 illustrates an example first system. As shown in FIG. 1, the example first system includes system 100. Also, as shown in FIG. 1, system 100 includes a computing platform 101 coupled to a network 170. In some examples, as shown in FIG. 1, computing platform 101 may couple to network 170 via a network communication (comm.) channel 175 and through a network device 110 (e.g., a network interface controller (NIC)) having one or more ports connected or coupled to network comm. channel 175.

In some examples, computing platform 101 may be deployed as part of a group of network function virtualization (NFV) computing platforms. These NFV computing platforms may be deployed in service provider (e.g., communications service providers, cloud service providers, etc.) and/or data center networks and may be capable of hosting many different virtual network functions (VNFs) as well as many different application types running in or being executed by virtual machines (VMs) and/or containers to support VNFs (VMs and VNFs are not shown in FIG. 1).

According to some examples, computing platform 101, as shown in FIG. 1, may include circuitry 120, memory 130, a network (NW) I/O device driver 140, an operating system 150 or one or more application(s) 160. In some examples, as shown in FIG. 1, circuitry 120 may communicatively couple to memory 130 and network I/O device 110 via comm. link 155. Although not shown in FIG. 1, in some examples, operating system 150, NW I/O device driver 140 or application(s) 160 may be implemented, at least in part, via cooperation between one or more memory devices included in memory 130 (e.g., volatile or non-volatile memory devices) and elements of circuitry 120 such as processing cores 112-1 to 112-$m$, where "m" is any positive whole integer greater than 2. In some examples, application(s) 160 may be associated with one or more VNFs supported by VMs hosted by computing platform 101.

In some examples, computing resources of computing platform 101 such as, but not limited to, circuitry 120, memory 130 and network I/O device 110 may be allocated to enable one or more VMs to support one or more VNFs. As described more below, allocation of these types of computing resources may be to support a virtual switch (vSwitch). The vSwitch may be implemented as an OpenFlow switch according to one or more OpenFlow specifications published by the Open Network Foundation such as, but not limited to, the OpenFlow Switch Specification, Version 1.5.1, published in March 2015. A vSwitch implemented as an OpenFlow switch may be referred to as an OpenFlow vSwitch, one of such vSwitch may be called Open vSwitch (OvS). Also, as described more below, a vSwitch (e.g., the OvS) may include a classifier to classify packets routed to or from a computing platform or between virtualized elements supported by the computing platform (e.g., between VMs). The classifier may have multiple layers to classify a packet for routing the packet. The multiple layers may include use of an exact match cache (EMC) (not shown in FIG. 1) at a first layer and implementation of a dynamic cache insertion rate algorithm or scheme that may allow for a dynamic variation of a cache insertion rate for the EMC based on history information related to routing or classifying packets (e.g., cache miss ratio, insertion ratio, throughput, etc.).

In some examples, computing platform 101, may include, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Also, circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors; and similar processors.

According to some examples, memory 130 may be composed of one or more memory devices or dies which may include various types of volatile and/or non-volatile memory. Volatile types of memory may include, but are not limited to, dynamic random access memory (DRAM), static random access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), or a combination of any of the above.

Figure 2:
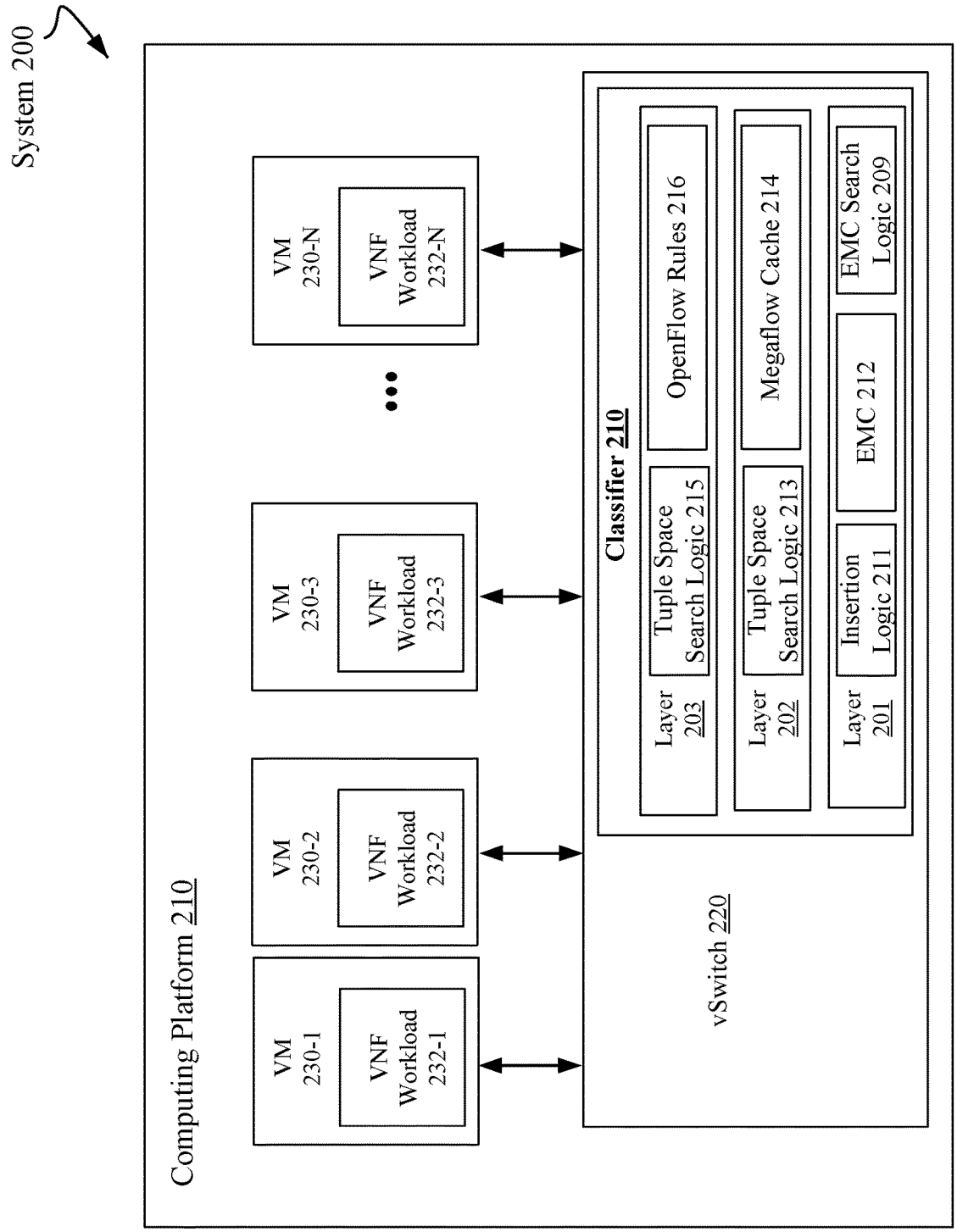
FIG. 2 illustrates an example second system.

FIG. 2 illustrates an example system 200. In some examples, as shown in FIG. 2, system 200 includes a 210 having a vSwitch 220, VMs 230-1 to 230-N (where "n" is any positive whole integer greater than 3). Also, as shown in FIG. 1, vSwitch 220 includes a type of processing logic such as a classifier 210. As described more below, classifier 210 may be a type of processing logic having layers 201, 202 and 203. Layers 201, 202 and 203 may have logic and/or features arranged to facilitate classification of packets routed to or from 210 or between VMs 230-1 to 230-N. The packets, for example, may have packet traffic patterns associated with VNF workloads 232-1 to 232-N supported by respective VMs 230-1 to 230-N.

In some examples, VNF workloads 232-1 to 232-$n$, may represent workloads associated with respective one or more applications for VNFs supported by elements of 210. For these examples, vSwitch 220 may be allocated or dimensioned to support intra-VM communications and/or process ingress/egress packets received or transmitted from 210 in order to fulfill VNF workloads 231-1 to 232-n. According to some examples, VNF workloads 232-1 to 232-n may be related to fulfilling a function, task or service that may include, but is not limited to, firewalling, domain service, network address translation, session border controller, caching, video-optimizer, content distribution network, wireless base station or radio network controller or wireless local area network access point or gateway. VNF workloads 232-1 to 232-2 may be related to all or least a portion of one or more functions, tasks or services supported by respective VMs 230-1 to 230-N.

According to some examples, vSwitch 220 may be arranged to operate as an OvS. For these examples, a hierarchical packet classification mechanism may be implemented by classifier 210 to classify packets routed to and/or between VMs 230-1 to 230-N based on packet header information. The multi-layer classification scheme may include a layer 201, a layer 202 and a layer 203.

In some examples, a top layer of the hierarchical packet classification mechanism may be layer 203. For these examples, layer 203 may include tuple space search logic 215 to search for OpenFlow rules 216 to classify a packet, e.g., based on packet header information. For these examples, packets that come to layer 203 may need to find the highest priority OpenFlow rules among all matching rules associated with classifying a packet.

According to some examples, a middle layer of the hierarchical packet classification mechanism may be layer 202. For these examples, layer 202 may include tuple space search logic 213 to match at most one rule in a megaflow cache 214 that includes a plurality of hash tables. Layer 202 may classify packets much faster than layer 203 since rules are non-overlapping. Packets that come to layer 202 can return as soon as a first matching rule is found from among the plurality of hash table since no other tuples could possibly have a match.

In some examples, the bottom layer of the hierarchical packet classification mechanism may be layer 201. For these examples, EMC 212 may include a single hash table via which EMC search logic 209 tries to match each packet's full header. Layer 201 may classify packets faster than layer 202 since layer 201 requires only one hash table lookup with no wildcard masking needed. As described more below, logic and/or features of a classifier such as insertion logic 211 may implement one or more schemes to improve memory efficiency of an EMC such as EMC 212 by dynamically adjusting or varying a cache insertion ratio or rate for the EMC based on history information related to classifying and routing packets.

According to some examples, an incoming packet may be classified as part of the hierarchical packet classification mechanism by EMC search logic 209 of layer 201 first searching EMC 212 for a header match. If a miss, tuple space search logic 213 of layer 202 may search megaflow cache 214. If a miss again, tuple space search logic 215 of layer 203 may search the OpenFlow rules 216.

Figure 3:
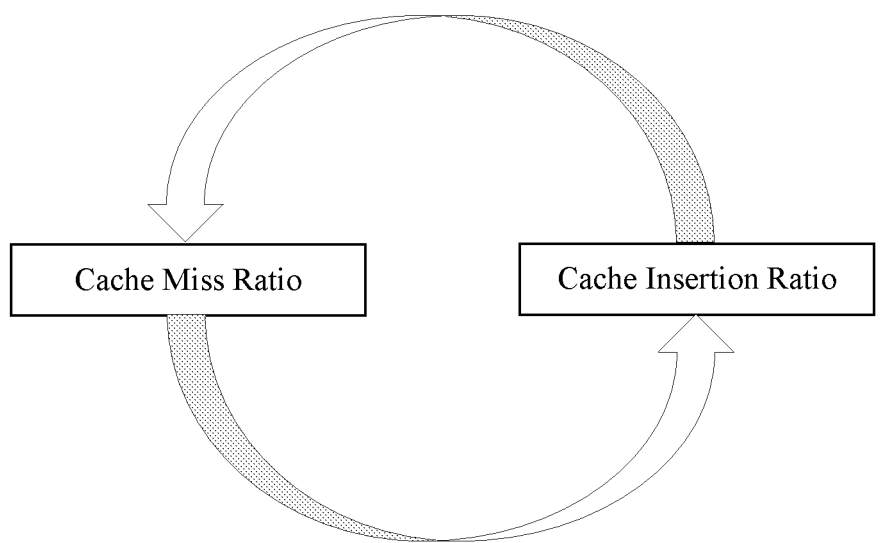
FIG. 3 illustrates an example feedback loop.

FIG. 3 illustrates an example feedback loop 300. In some examples, feedback loop 300 may be implemented by logic and/or features of a vSwitch classifier such as insertion logic 211 of classifier 210 to dynamically adjust or vary a cache insertion ratio or rate of an EMC such as EMC 212. For these examples, the EMC may be included in a bottom layer of a hierarchical packet classification mechanism utilized by a vSwitch such as OvS. Although examples are not limited to use of feedback loop 300 for an EMC of a vSwitch. Other types of vSwitches having an EMC may use feedback loop 300 for dynamically adjusting a cache insertion ratio or rate (e.g., a vector packet processing (VPP) vSwitch). Also, types of hardware based caches may use feedback loop 300 for dynamically adjusting a cache insertion ratio or rate. Thus, examples are not limited to use of feedback loop 300 for an EMC of a vSwitch deployed as an OvS.

According to some examples, as shown in FIG. 3, feedback loop 300 includes a cache miss ratio and a cache insertion ratio. For these examples, a time window or interval (e.g., a few seconds) may be established for determining a cache miss ratio. A cache miss ratio for a given time window may be determined and compared to a cache miss ratio of a time window determined previous to the given time window. Differences in the cache miss ratio may indicate a trend in workload patterns.

In some examples, packet traffic patterns for packets routed between VMs associated with VNF workloads 232-1 to 232-N through vSwitch 220 may indicate a trend in workload patterns. A determined cache miss ratio of 1 (100% cache miss rate) indicates that current workload patterns associated with VNF workloads 232-1 to 232-N for a time window are different from workload patterns associated with VNF workloads 232-1 to 232-N for a previous time window. For these examples, the cache miss ratio of 1 may be used to decide a cache insertion rate for a next or subsequent time window. Feedback loop 300 may be viewed as a type of "fuzzy control system" in control theory.

According to some examples, a simple, basic design for feedback loop 300, when utilized by elements of vSwitch 120 such as insertion logic 211, may include setting an initial cache insertion ratio to 1 (100% cache insertion rate). Setting the initial cache insertion ratio to 1 means that for every cache miss a cache insertion will result. Following a first time window or interval of p seconds (p=any positive integer), a first cache miss ratio may be determined and recorded. Following a second, subsequent time window of p seconds, a second cache miss ratio may be determined and recorded. A history of two cache miss ratios have now been recorded. This history of cache miss ratios may be used to determine a subsequent cache insertion ratio for a next time window of p seconds. As described more below, the initial or previous cache insertion ratio may also be a factor in determining the subsequent cache insertion ratio.

FIG. 4 illustrates an example code 400. In some examples, code 400 may be a pseudo code to represent an example algorithm for dynamically adjusting or varying a cache insertion ratio or rate for a cache (e.g., an EMC using in an OvS). For these examples, "miss[0]" may represent a previously recorded cache miss ratio and "miss[1]" may represent a newly recorded cache miss ratio. Thus, miss[0] and miss[1] represent two cache miss ratios from a history. The history, for example, may be recorded as mentioned above for feedback loop 300. Also for these examples, "d_miss" may represent a difference in cache miss ratios for miss[1] and miss[2], "insert_ratio" may represent a subsequent cache insertion ratio, "step" may represent incremental adjustments to the subsequent cache insertion ratio, and "Prev_insert_change" may represent previous incremental adjustments made to the current cache insertion ratio.

Figure 5:
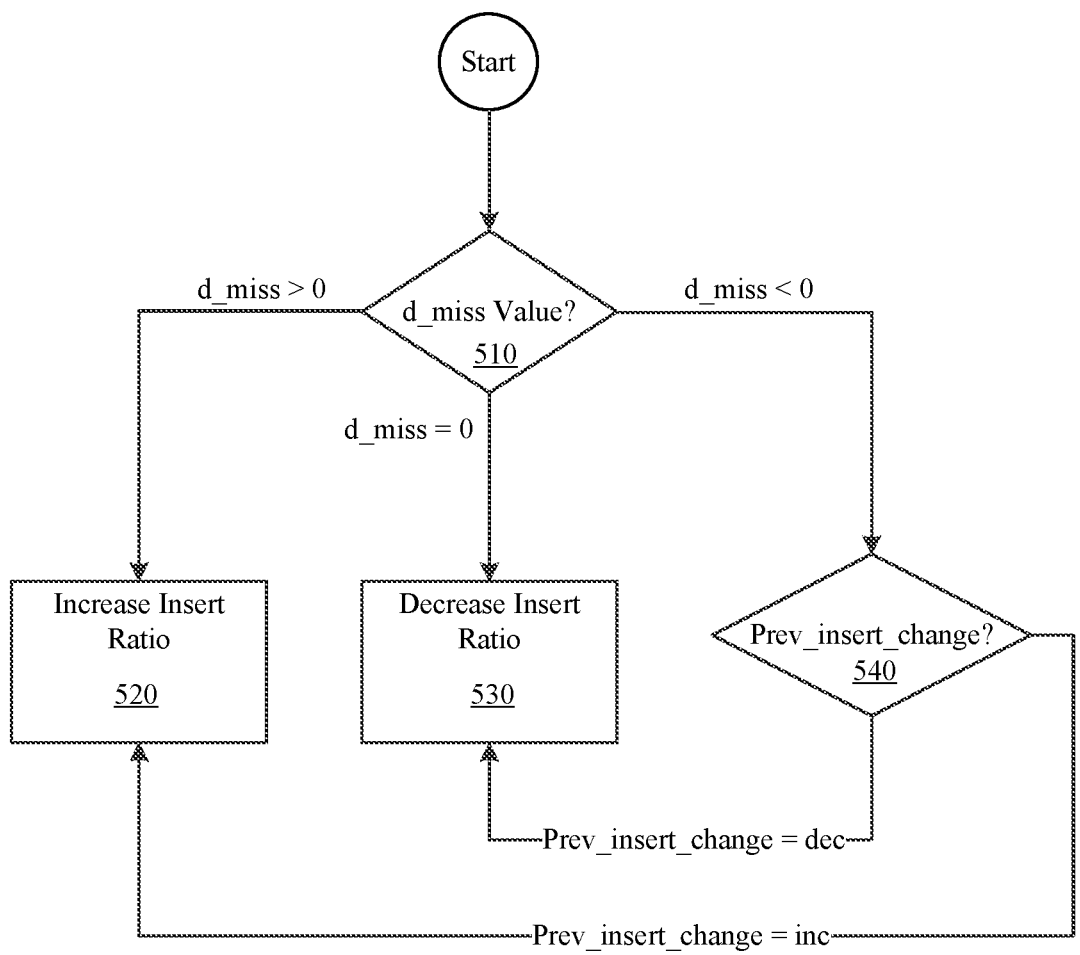
FIG. 5 illustrates an example first logic flow.

FIG. 5 illustrates an example flow 500. In some examples, flow 500 may describe a logic flow for the pseudo code included in example code 400. For these examples, elements of system 200 such as vSwitch 220 that includes classifier 210 having insertion logic 211 and EMC 212 for a first or bottom layer of a hierarchical packet classification mechanism may be used to describe various portions of flow 500. Examples, are not limited to elements of system 200, other types of caches (e.g., hardware caches) and other logic and/or features are contemplated as being capable of implementing code 400 following flow 500 to dynamically vary a cache insertion ratio or rate.

Moving from the start to decision block 510 (d_miss Value?), insertion logic 211 may determine a difference between miss[1] and miss[0] to determine a value for d_miss. If the value for d_miss is greater than 0, flow 500 moves to block 520. If the value for d_miss is equal to 0, flow 500 moves to block 530, or if the value for d_miss is less than 0, flow 500 moves to decision block 540.

Moving from decision block 510 to block 520 (Increase Insert Ratio), insertion logic 211 may increase the cache insertion ratio for EMC 212. In some examples, if the value for d_miss is greater than 0 this may indicate the cache miss ratio has increased and may also indicate that a packet traffic pattern has changed during a current time window and EMC content may not be updated frequently enough to avoid cache misses. For these examples, the cache insertion ratio for EMC 212 may be increased or incremented by a step value such as, but not limited to, 0.01 to cause a 1% increase in the cache insertion ratio.

Moving from decision block 510 to block 530 (Decrease Insert Rate), insertion logic 211 may decrease the cache insertion ratio for EMC 212. According to some examples, if the value for d_miss is equal to 0 this may indicate the cache miss ratio has remained constant or unchanged compared to the previous time window. This may mean that either the current insertion ratio is adequate or an even lower cache insertion ratio may be used. Decision block 510 depicts an instance where a lower cache insertion ratio is used. For these examples, the cache insertion ratio for EMC 212 may be decreased or decremented by a step value such as, but not limited to, 0.01 to cause a 1% decrease in the cache insertion ratio.

Moving from decision block 510 to decision block 540 (Prev_insert_change?), insertion logic 211 may look at a previous change or adjustment in the insertion ratio. In some examples, if the previous adjustment was an increase (inc) in the insertion ratio, flow 500 moves to block 520, where, as mentioned above, the insertion ratio is increased. For these examples, the reasoning for increasing the insertion ratio is that if a previous increase in the insertion ratio resulted in fewer cache misses, then an additional increase may further reduce cache misses. In some other examples, if the previous adjustment was a decrease (dec) in the insertion ratio, flow 500 moves to block 530, where, as mentioned above, the insertion ratio is decreased. For these other examples, the reasoning for decreasing the insertion ratio is that if a previous decrease in the insertion ratio resulted in fewer cache misses, then an additional decrease may not cause additional cache misses.

According to some examples, feedback loop 300 may result in insertion logic 211 continuing to determine cache miss ratios for each time window and adjust cache insertion ratios according to example code 400.

In some examples, example code 400 may modified to use more complex conditions than cache miss ratio changes of >0, ==0 or <0. For these examples, four conditions for d_miss may include:

1. d_miss≥threshold2
2. d_miss≥threshold1 and d_miss<threshold2
3. d_miss≥−threshold1 and d_miss<threshold1
4. d_miss≤−threshold1

For the above four conditions, a cache insertion ratio may be adjusted according to an identified threshold (e.g. threshold1 or threshold2). For example, if d_miss≥threshold2, cache insertion ratio may be increased by 2*step. If d_miss<threshold2 but≥threshold1, cache insertion ratio may be increased by 1*step. If d_miss>−threshold1 and <threshold1, it may be supposed that the cache miss ratio did not change and this may work as a filter to filter out small amounts of noise.

Figure 6:
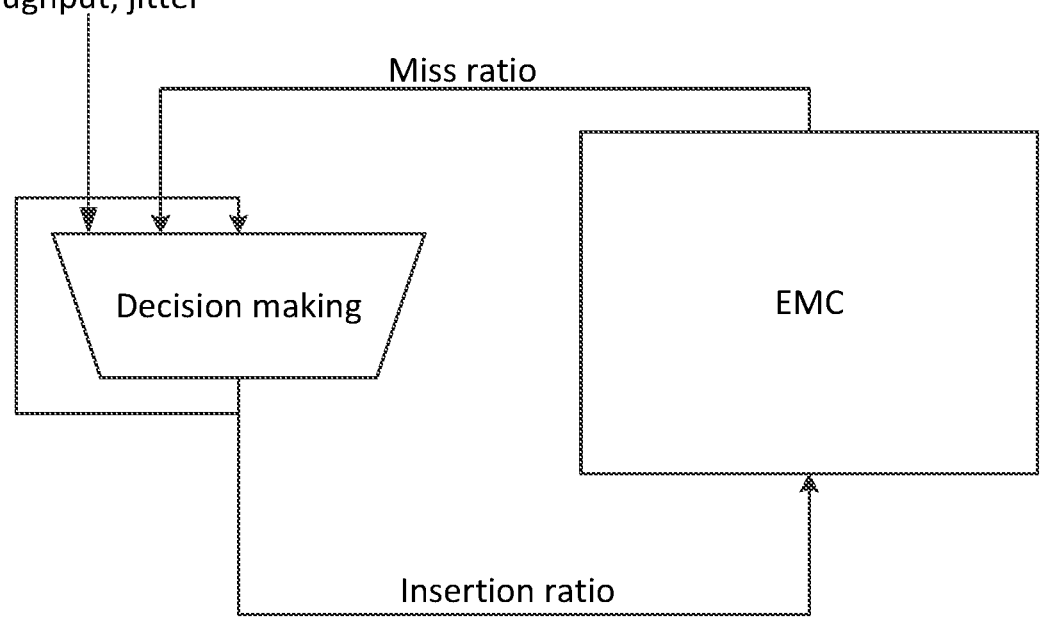
FIG. 6 illustrates an example scheme.

FIG. 6 illustrates an example scheme 600. In some examples, scheme 600 may depict how other factors observed at a vSwitch such as latency (e.g., time to route or classify packets), throughput (amount of packets routed or classified in a period of time) and jitter (variations in latency) in addition to a cache miss ratio may be accounted for to make a decision regarding a cache insertion ratio or rate. These other factors may be included in decision making to dynamically determine a cache insertion ratio for an EMC. Use of these other factors may include using a longer history of cache miss ratios or using more factors. More generally, if a history of cache miss ratios is miss[0], miss[1], miss[2], . . . , a history cache insertion ratio as insert[0], insert[1], insert[2], . . . and the cache insertion ratio for a next time window as y, then an algorithm may include y as a function of miss[i] and insert[i]. Therefore y=f(miss[0], miss[1], miss[2], . . . , insert[0], insert[1], insert[2], . . . ). Or, even more general, y=f(factor[0], factor[1], factor[2], . . . ).

FIG. 7 illustrates an example code 700. In some examples, code 700 may be a pseudo code to represent an example algorithm for dynamically adjusting or varying a cache insertion ratio or rate via use of other factors in addition to a cache miss ratio. Code 700 may be used by logic and/or features of a vSwitch to implement a scheme similar to scheme 600 shown in FIG. 6 and mentioned above. For these examples, "factor[0]" may represent previously recorded factors for a cache miss ratio multiplied by a first coefficient "a", a latency multiplied by a second coefficient "b", a jitter multiplied by a third coefficient "c", or a throughput multiplied by a fourth coefficient of "d". The history of these factors, for example, may be recorded in a similar manner as mentioned above for feedback loop 300. Also, for example code 700, "d_factor" may represent a difference in factors for factor[1] and factor[2], "insert_ratio" may represent a subsequent cache insertion ratio, "step" may represent incremental adjustments to the subsequent cache insertion ratio, and "Prev_insert_change" may represent previous incremental adjustments made to the current cache insertion ratio. A similar logic flow as shown in FIG. 5 for pseudo code 400 may be followed when implementing example code 700 by simply replacing "d_miss" with "d_factor" to determine whether to change a cache insertion ratio or rate.

According to some examples, coefficients a, b, c or d may be based on weighting certain factors more, less or equal in order to determine subsequent cache insertions rates. For example, coefficient a, may be set to a value such that cache miss ratio is the largest, weighted factor in determining whether to change a cache insertion ratio. In other examples, coefficient d, may be set to a value such that throughput (e.g., data throughput) is the largest, weighted factor in determining whether to change a cache insertion ratio. In yet other examples, coefficients for jitter or latency may set to values such that these factors have a lower weighting compared to cache miss ratios or throughput.

Examples are not limited to a linear type relation between the factors of cache miss ratios, latency, jitter or throughput as shown in FIG. 7 for code 700. In other examples, non-linear relationships may be derived between one or more of these or even additional factors to determine whether to adjust cache insertion rates or ratios.

Figure 8:
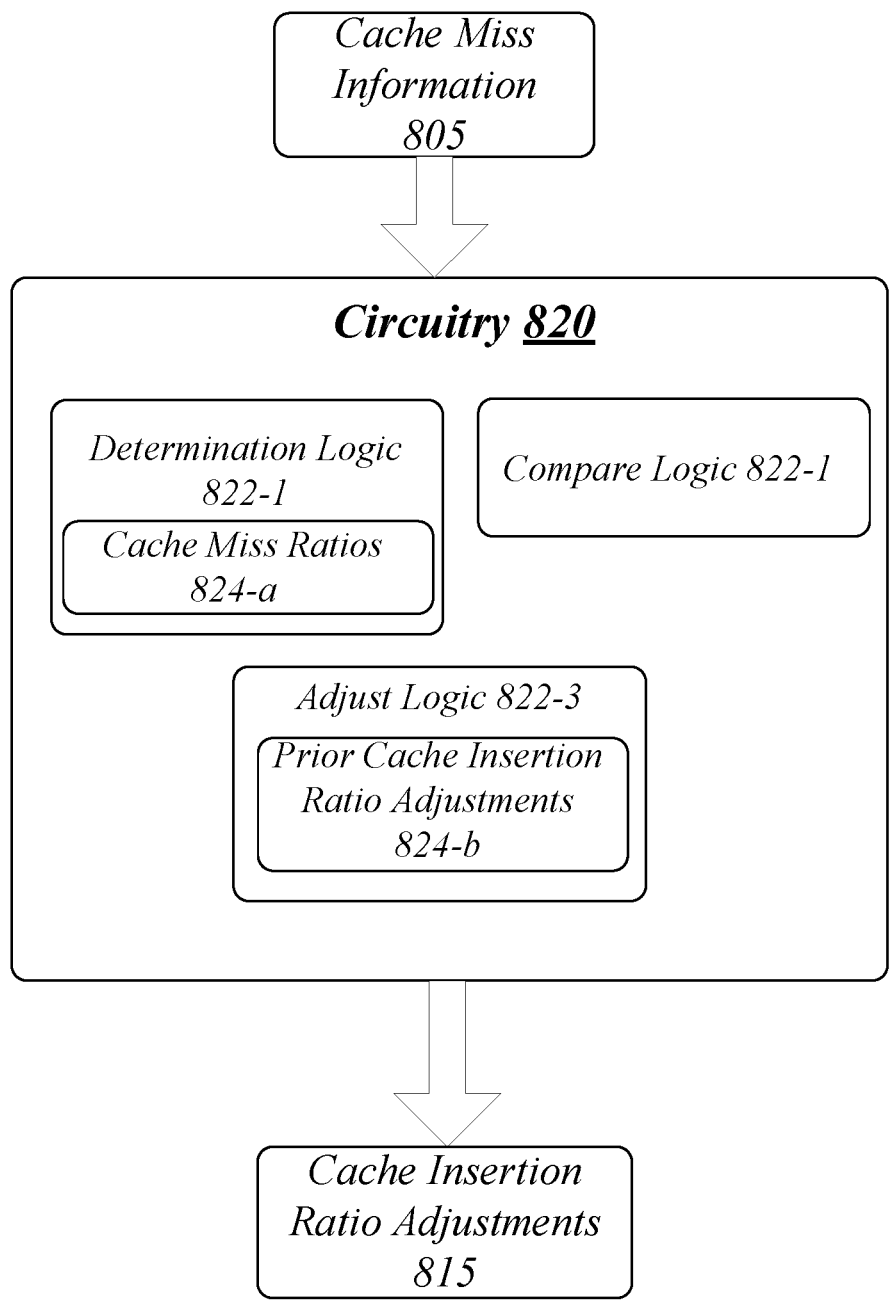
FIG. 8 illustrates an example block diagram for an apparatus.

FIG. 8 illustrates an example block diagram for an apparatus 800. Although apparatus 800 shown in FIG. 8 has a limited number of elements in a certain topology, it may be appreciated that the apparatus 800 may include more or less elements in alternate topologies as desired for a given implementation.

According to some examples, apparatus 800 may be associated with logic and/or features of processing logic hosted by a computing platform (e.g., insertion logic 211 of classifier 210 as shown in FIG. 2) and may be supported by circuitry 820. For these examples, circuitry 820 may be incorporated within circuitry, processor circuitry, processing element, CPU or core maintained at the computing platform. Circuitry 820 may be arranged to execute one or more software, firmware or hardware implemented modules, components or logic 822-$a$. Module, component or logic may be used interchangeably in this context. It is worthy to note that "a" and "b" and "c" and similar designators as used herein are intended to be variables representing any positive integer. Thus, for example, if an implementation sets a value for a=3, then a complete set software, firmware and/or hardware for logic 822-$a$ may include logic 822-1, 822-2, or 822-3. The examples presented are not limited in this context and the different variables used throughout may represent the same or different integer values. Also, "logic", "module" or "component" may also include software/firmware stored in computer-readable media, and although the types of logic are shown in FIG. 8 as discrete boxes, this does not limit these components to storage in distinct computer-readable media components (e.g., a separate memory, etc.).

According to some examples, circuitry 820 may include a processor, processor circuit, processor circuitry, processor element, core or CPU. Circuitry 820 may be generally arranged to execute or implement one or more modules, components or logic 822-$a$. Circuitry 820 may be all or at least a portion of any of various commercially available processors, including without limitation an Intel® Atom®, Celeron®, Core (2) Duo®, Core i3, Core i5, Core i7, Itanium®, Pentium®, Xeon®, Xeon Phi® and XScale® processors; or similar processors. According to some examples, circuitry 820 may also include an application specific integrated circuit (ASIC) and at least some logic 822-$a$ may be implemented as hardware elements of the ASIC. According to some examples, circuitry 820 may also include a field programmable gate array (FPGA) and at least some logic 822-$a$ may be implemented as hardware elements of the FPGA.

According to some examples, apparatus 800 may include determination logic 822-1. Determination logic 822-1 may be executed or implemented by circuitry 820 to determine, during a first time interval, a first cache miss ratio for a cache arranged to store information used by processing logic hosted by the computing platform. Determination logic may also determine, during a second time interval, a second cache miss ratio for the cache. For these examples, determination logic 822-1 may use cache miss information 805 to determine the first and second cache miss ratios. Determination logic 822-1 may maintain determined cache miss ratios in cache miss ratios 824-$a$. Cache miss ratios 824-$a$ may be arranged as a data structure such as a lookup table (LUT).

In some examples, apparatus 800 may include compare logic 822-2. Compare logic 822-2 may be executed or implemented by circuitry 820 to compare the first cache miss ratio to the second cache miss ratio to determine whether to adjust a cache insertion ratio used for the second time interval for use during a subsequent time interval. The cache insertion ratio may be based on a ratio of cache misses to cache insertions. For these examples, compare logic 822-2 may obtain the first and second cache miss ratios from cache miss ratios 824-$a$.

According to some examples, apparatus 800 may include adjust logic 822-3. Adjust logic 822-3 may be executed or implemented by circuitry 820 to adjust the cache insertion ratio used for the second time interval to cause either a reduction or an increase in the cache insertion ratio used for the second time interval based on the comparison of the first and second cache miss ratios by compare logic 822-2. If the comparison indicates the first and second cache miss ratios are equal, the cache insertion ratio may be reduced or decreased. If the comparison indicates the first cache miss ratio is lower than the second cache miss ratio, the cache insertion ratio may be increased. If the comparison indicates the first cache miss ratio is higher than the second cache miss ratio, the cache insertion ratio may be reduced or increased based on whether a previous adjustment to the cache insertion ratio was an increase or decrease. Adjust logic 822-3 may maintain prior cache insertion ratio adjustments 824-$b$ (e.g., in a LUT) in order to have a history of previous adjustments. In some examples, cache insertion ratio adjustments 815 may include an indication of what adjustments were determined to be needed by adjust logic 822-3.

Various components of apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 9 illustrates an example of a logic flow 900. Logic flow 900 may be representative of some or all of the operations executed by one or more logic, features, or devices described herein, such as apparatus 800. More particularly, logic flow 900 may be implemented by at least determination logic 822-1 or compare logic 822-2

According to some examples, logic flow 900 at block 902 may determine, during a first time interval, a first cache miss ratio for a cache arranged to store information used by processing logic hosted by a computing platform. For these examples, determination logic 822-1 may determine the first cache miss ratio.

In some examples, logic flow 900 at block 904 may determine, during a second time interval, a second cache miss ratio for the cache. For these examples, determination logic 822-1 may determine the second cache miss ratio.

According to some examples, logic flow 900 at block 906 may compare the first cache miss ratio to the second cache miss ratio to determine whether to adjust a cache insertion ratio used for the second time interval for use during a subsequent time interval, the cache insertion ratio based on a ratio of cache misses to cache insertions. For these examples, compare logic 822-2 may compare the first and second cache miss ratios.

FIG. 10 illustrates an example of a storage medium 1000. Storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
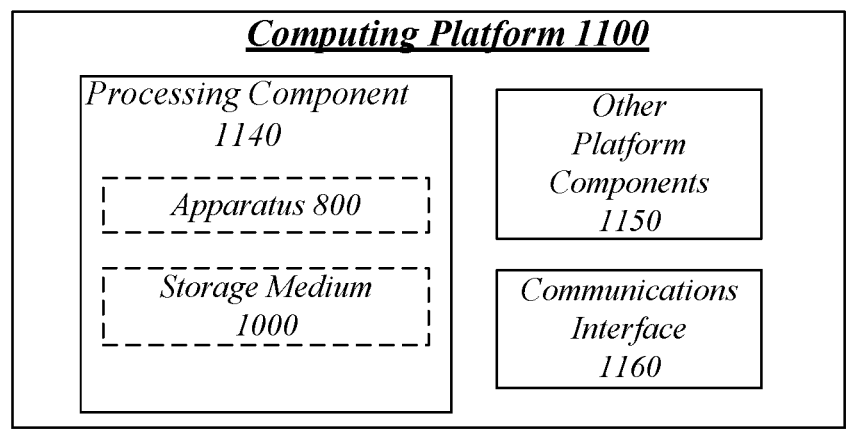
FIG. 11 illustrates an example computing platform.

FIG. 11 illustrates an example computing platform 1100. In some examples, as shown in FIG. 11, computing platform 1100 may include a processing component 1140, other platform components 1150 or a communications interface 1160. According to some examples, computing platform 1100 may be implemented in a server. The server may be capable of coupling through a network to other servers and may be part of a datacenter including a plurality of network connected servers arranged to host one or more VMs.

According to some examples, processing component 1140 may execute processing operations or logic for apparatus 800 and/or storage medium 1000. Processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

As mentioned above computing platform 1100 may be implemented in a server of a datacenter. Accordingly, functions and/or specific configurations of computing platform 1100 described herein, may be included or omitted in various embodiments of computing platform 1100, as suitably desired for a server deployed in a datacenter.

The components and features of computing platform 1100 may be implemented using any combination of discrete circuitry, ASICs, logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry for a computing platform. The apparatus may also include logic for execution by the circuitry. The logic may determine, during a first time interval, a first cache miss ratio for a cache arranged to store information used by processing logic hosted by the computing platform; determine, during a second time interval, a second cache miss ratio for the cache. The logic may also compare the first cache miss ratio to the second cache miss ratio to determine whether to adjust a cache insertion ratio used for the second time interval for use during a subsequent time interval. The cache insertion ratio may be based on a ratio of cache misses to cache insertions.

Example 2

The apparatus of example 1, the logic may also adjust the cache insertion ratio used for the second time interval to cause a reduction in the cache insertion ratio for use during the subsequent time interval based on the first cache miss ratio being equal to the second cache miss ratio.

Example 3

The apparatus of example 1, the logic may also adjust the cache insertion ratio used for the second time interval to cause an increase in the cache insertion ratio for use during the subsequent time interval based on the first cache miss ratio being lower than the second cache miss ratio.

Example 4

The apparatus of example 1, the logic may also adjust the cache insertion ratio used for the second time interval to cause an increase in the cache insertion ratio for use during the subsequent time interval based on the first cache miss ratio being higher than the second cache miss ratio and a previous adjustment to the cache insertion ratio used for the second time interval resulted in an increase in a cache insertion ratio for use during the second time interval.

Example 5

The apparatus of example 1, the logic may also adjust the cache insertion ratio used for the second time interval to cause a decrease in the cache insertion ratio for use during the subsequent time interval based on the first cache miss ratio being higher than the second cache miss ratio and a previous adjustment to the cache insertion ratio used for the second time interval resulted in a decrease in a cache insertion ratio for use during the second time interval.

Example 6

The apparatus of example 1, the cache insertions may include a retrieval of information from a memory separate from the cache and an insertion of the retrieved information in the cache.

Example 7

The apparatus of example 1, the cache may be an exact match cache.

Example 8

The apparatus of example 7, the processing logic may include a classifier for a virtual switch. The information stored to the exact match cache may be used to match packet headers for packets routed by the virtual switch.

Example 9

The apparatus of claim 8, the logic may also determine, during the first time interval, a first latency for the virtual switch to route packets, a first jitter for variations in the first latency, or a first throughput for packets routed by the virtual switch. The logic may also add the first latency, the first jitter or the first throughput to the first cache miss ratio to generate a first factor. The logic may also determine, during the second time interval, a second latency for the virtual switch to route packets, a second jitter for variations in the second latency, or a second throughput for packets routed by the virtual switch. The logic may also add the second latency, the second jitter or the second throughput to the second cache miss ratio to generate a second factor. The logic may also compare the first factor to the second factor to determine whether to adjust the cache insertion ratio used for the second time interval for use during the subsequent time interval.

Example 10

The apparatus of example 9, the virtual switch may operate in accordance with an OpenFlow Switch specification.

Example 11

The apparatus of example 1 may also include a digital display coupled to the circuitry to present a user interface view.

Example 12

An example method may include determining, during a first time interval, a first cache miss ratio for a cache arranged to store information used by processing logic hosted by a computing platform. The method may also include determining, during a second time interval, a second cache miss ratio for the cache. The method may also include comparing the first cache miss ratio to the second cache miss ratio to determine whether to adjust a cache insertion ratio used for the second time interval for use during a subsequent time interval. The cache insertion ratio may be based on a ratio of cache misses to cache insertions.

Example 13

The method of example 12 may also include adjusting the cache insertion ratio used for the second time interval to cause a reduction in the cache insertion ratio for use during the subsequent time interval based on the first cache miss ratio being equal to the second cache miss ratio.

Example 14

The method of example 12 may also include adjusting the cache insertion ratio used for the second time interval to cause an increase in the cache insertion ratio for use during the subsequent time interval based on the first cache miss ratio being lower than the second cache miss ratio.

Example 15

The method of example 12 may also include adjusting the cache insertion ratio used for the second time interval to cause an increase in the cache insertion ratio for use during the subsequent time interval based on the first cache miss ratio being higher than the second cache miss ratio and a previous adjustment to the cache insertion ratio used for the second time interval resulted in an increase in a cache insertion ratio for use during the second time interval.

Example 16

The method of example 12 may also include adjusting the cache insertion ratio used for the second time interval to cause a decrease in the cache insertion ratio for use during the subsequent time interval based on the first cache miss ratio being higher than the second cache miss ratio and a previous adjustment to the cache insertion ratio used for the second time interval resulted in a decrease in a cache insertion ratio for use during the second time interval.

Example 17

The method of example 12, the cache insertions may include retrieving information from a memory separate from the cache and inserting the retrieved information in the cache.

Example 18

The method of example 12, the cache may be an exact match cache.

Example 19

The method of example 18, the processing logic may be a classifier for a virtual switch, the information stored to the exact match cache used to match packet headers for packets routed by the virtual switch.

Example 20

The method of example 19 may also include determining, during the first time interval, a first latency for the virtual switch to route packets, a first jitter for variations in the first latency, or a first throughput for packets routed by the virtual switch. The method may also include adding the first latency, the first jitter or the first throughput to the first cache miss ratio to generate a first factor. The method may also include determining, during the second time interval, a second latency for the virtual switch to route packets, a second jitter for variations in the second latency, or a second throughput for packets routed by the virtual switch. The method may also include adding the second latency, the second jitter or the second throughput to the second cache miss ratio to generate a second factor. The method may also include comparing the first factor to the second factor to determine whether to adjust the cache insertion ratio used for the second time interval for use during the subsequent time interval.

Example 21

The method of example 20, the virtual switch may operate in accordance with an OpenFlow Switch specification.

Example 22

An example at least one machine readable medium may include a plurality of instructions that in response to being executed by a system may cause the system to carry out a method according to any one of examples 12 to 21.

Example 23

An example apparatus may include means for performing the methods of any one of examples 12 to 21.

Example 24

An example at least one machine readable medium may include a plurality of instructions that in response to being executed by a system at a computing platform may cause the system to determine, during a first time window, a first cache miss ratio for a cache arranged to store information used by processing logic hosted by the computing platform. The instructions may also cause the system to determine, during a second time window, a second cache miss ratio for the cache. The instructions may also cause the system to compare the first cache miss ratio to the second cache miss ratio to determine whether to adjust a cache insertion ratio used for the second time window for use during a subsequent time window. The cache insertion ratio may be based on a ratio of cache misses to cache insertions.

Example 25

The at least one machine readable medium of example 24, the instructions may further cause the system to adjust the cache insertion ratio used for the second time window to cause a reduction in the cache insertion ratio for use during the subsequent time window based on the first cache miss ratio being equal to the second cache miss ratio.

Example 26

The at least one machine readable medium of example 24, the instructions may further cause the system to adjust the cache insertion ratio used for the second time window to cause an increase in the cache insertion ratio for use during the subsequent time window based on the first cache miss ratio being lower than the second cache miss ratio.

Example 27

The at least one machine readable medium of example 24, the instructions may further cause the system to adjust the cache insertion ratio used for the second time window to cause an increase in the cache insertion ratio for use during the subsequent time window based on the first cache miss ratio being higher than the second cache miss ratio and a previous adjustment to the cache insertion ratio used for the second time window resulted in an increase in a cache insertion ratio for use during the second time window.

Example 28

The at least one machine readable medium of example 24, the instructions may further cause the system to adjust the cache insertion ratio used for the second time window to cause a decrease in the cache insertion ratio for use during the subsequent time window based on the first cache miss ratio being higher than the second cache miss ratio and a previous adjustment to the cache insertion ratio used for the second time window resulted in a decrease in a cache insertion ratio for use during the second time window.

Example 29

The at least one machine readable medium of example 24, the cache insertions may include a retrieval of information from a memory separate from the cache and an insertion of the retrieved information in the cache.

Example 30

The at least one machine readable medium of example 24, the cache may be an exact match cache.

Example 31

The at least one machine readable medium of example 30, the processing logic may be a classifier for a virtual switch. The information stored to the exact match cache may be used to match packet headers for packets routed by the virtual switch.

Example 32

The at least one machine readable medium of example 31, the instructions may further cause the system to determine, during the first time interval, a first latency for the virtual switch to route packets, a first jitter for variations in the first latency, or a first throughput for packets routed by the virtual switch. The instructions may also cause the system to add the first latency, the first jitter or the first throughput to the first cache miss ratio to generate a first factor. The instructions may also cause the system to determine, during the second time interval, a second latency for the virtual switch to route packets, a second jitter for variations in the second latency, or a second throughput for packets routed by the virtual switch. The instructions may also cause the system to add the second latency, the second jitter or the second throughput to the second cache miss ratio to generate a second factor. The instructions may also cause the system to compare the first factor to the second factor to determine whether to adjust the cache insertion ratio used for the second time interval for use during the subsequent time interval.

Example 33

The at least one machine readable medium of example 31, the virtual switch may operate in accordance with an OpenFlow Switch specification.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry; and
   logic for execution by the circuitry to:
      determine, during a first time interval, a first cache miss ratio for a cache arranged to store information used by processing logic hosted by a computing platform;
      determine, during a second time interval, a second cache miss ratio for the cache; and
      compare the first cache miss ratio to the second cache miss ratio to determine whether to adjust a cache insertion ratio used for the second time interval for use during a subsequent time interval, the cache insertion ratio based on a ratio of cache misses to cache insertions.

2. The apparatus of claim 1, comprising the logic to:
   adjust the cache insertion ratio used for the second time interval to cause a reduction in the cache insertion ratio for use during the subsequent time interval based on the first cache miss ratio being equal to the second cache miss ratio.

3. The apparatus of claim 1, comprising the logic to:
   adjust the cache insertion ratio used for the second time interval to cause an increase in the cache insertion ratio for use during the subsequent time interval based on the first cache miss ratio being lower than the second cache miss ratio.

4. The apparatus of claim 1, comprising the logic to:
   adjust the cache insertion ratio used for the second time interval to cause an increase in the cache insertion ratio for use during the subsequent time interval based on the first cache miss ratio being higher than the second cache miss ratio and a previous adjustment to the cache insertion ratio used for the second time interval resulted in an increase in a cache insertion ratio for use during the second time interval.

5. The apparatus of claim 1, comprising the logic to:
   adjust the cache insertion ratio used for the second time interval to cause a decrease in the cache insertion ratio for use during the subsequent time interval based on the first cache miss ratio being higher than the second cache miss ratio and a previous adjustment to the cache insertion ratio used for the second time interval resulted in a decrease in a cache insertion ratio for use during the second time interval.

6. The apparatus of claim 1, the cache comprising an exact match cache.

7. The apparatus of claim 6, the processing logic comprising a classifier for a virtual switch, the information stored to the exact match cache used to match packet headers for packets routed by the virtual switch.

8. The apparatus of claim 7, comprising the logic to:
   determine, during the first time interval, a first latency for the virtual switch to route packets, a first jitter for variations in the first latency, or a first throughput for packets routed by the virtual switch;
   add the first latency, the first jitter or the first throughput to the first cache miss ratio to generate a first factor;
   determine, during the second time interval, a second latency for the virtual switch to route packets, a second jitter for variations in the second latency, or a second throughput for packets routed by the virtual switch;
   add the second latency, the second jitter or the second throughput to the second cache miss ratio to generate a second factor; and
   compare the first factor to the second factor to determine whether to adjust the cache insertion ratio used for the second time interval for use during the subsequent time interval.

9. The apparatus of claim 7, comprising the virtual switch to operate in accordance with an OpenFlow Switch specification.

10. The apparatus of claim 1, comprising a digital display coupled to the circuitry to present a user interface view.

11. A method comprising:
    determining, during a first time interval, a first cache miss ratio for a cache arranged to store information used by processing logic hosted by a computing platform;
    determining, during a second time interval, a second cache miss ratio for the cache; and
    comparing the first cache miss ratio to the second cache miss ratio to determine whether to adjust a cache insertion ratio used for the second time interval for use during a subsequent time interval, the cache insertion ratio based on a ratio of cache misses to cache insertions.

12. The method of claim 11, comprising:
adjusting the cache insertion ratio used for the second time interval to cause a reduction in the cache insertion ratio for use during the subsequent time interval based on the first cache miss ratio being equal to the second cache miss ratio.

13. The method of claim 11, comprising:
adjusting the cache insertion ratio used for the second time interval to cause an increase in the cache insertion ratio for use during the subsequent time interval based on the first cache miss ratio being lower than the second cache miss ratio.

14. The method of claim 11, comprising:
adjusting the cache insertion ratio used for the second time interval to cause an increase in the cache insertion ratio for use during the subsequent time interval based on the first cache miss ratio being higher than the second cache miss ratio and a previous adjustment to the cache insertion ratio used for the second time interval resulted in an increase in a cache insertion ratio for use during the second time interval.

15. The method of claim 11, comprising:
adjusting the cache insertion ratio used for the second time interval to cause a decrease in the cache insertion ratio for use during the subsequent time interval based on the first cache miss ratio being higher than the second cache miss ratio and a previous adjustment to the cache insertion ratio used for the second time interval resulted in a decrease in a cache insertion ratio for use during the second time interval.

16. The method of claim 11, comprising the cache is an exact match cache and the processing logic is a classifier for a virtual switch, the information stored to the exact match cache used to match packet headers for packets routed by the virtual switch.

17. The method of claim 16, comprising:
determining, during the first time interval, a first latency for the virtual switch to route packets, a first jitter for variations in the first latency, or a first throughput for packets routed by the virtual switch;
adding the first latency, the first jitter or the first throughput to the first cache miss ratio to generate a first factor;
determining, during the second time interval, a second latency for the virtual switch to route packets, a second jitter for variations in the second latency, or a second throughput for packets routed by the virtual switch;
adding the second latency, the second jitter or the second throughput to the second cache miss ratio to generate a second factor; and
comparing the first factor to the second factor to determine whether to adjust the cache insertion ratio used for the second time interval for use during the subsequent time interval.

18. At least one machine readable medium comprising a plurality of instructions that in response to being executed by a system at a computing platform cause the system to:
determine, during a first time window, a first cache miss ratio for a cache arranged to store information used by processing logic hosted by the computing platform;
determine, during a second time window, a second cache miss ratio for the cache; and
compare the first cache miss ratio to the second cache miss ratio to determine whether to adjust a cache insertion ratio used for the second time window for use during a subsequent time window, the cache insertion ratio based on a ratio of cache misses to cache insertions.

19. The at least one machine readable medium of claim 18, comprising the instructions to further cause the system to:
adjust the cache insertion ratio used for the second time window to cause a reduction in the cache insertion ratio for use during the subsequent time window based on the first cache miss ratio being equal to the second cache miss ratio.

20. The at least one machine readable medium of claim 18, comprising the instructions to further cause the system to:
adjust the cache insertion ratio used for the second time window to cause an increase in the cache insertion ratio for use during the subsequent time window based on the first cache miss ratio being lower than the second cache miss ratio.

21. The at least one machine readable medium of claim 18, comprising the instructions to further cause the system to:
adjust the cache insertion ratio used for the second time window to cause an increase in the cache insertion ratio for use during the subsequent time window based on the first cache miss ratio being higher than the second cache miss ratio and a previous adjustment to the cache insertion ratio used for the second time window resulted in an increase in a cache insertion ratio for use during the second time window.

22. The at least one machine readable medium of claim 18, comprising the instructions to further cause the system to:
adjust the cache insertion ratio used for the second time window to cause a decrease in the cache insertion ratio for use during the subsequent time window based on the first cache miss ratio being higher than the second cache miss ratio and a previous adjustment to the cache insertion ratio used for the second time window resulted in a decrease in a cache insertion ratio for use during the second time window.

23. The at least one machine readable medium of claim 18, comprising the cache insertions to include a retrieval of information from a memory separate from the cache and an insertion of the retrieved information in the cache.

24. The at least one machine readable medium of claim 18, comprising the cache is an exact match cache, the processing logic is a classifier for a virtual switch, the information stored to the exact match cache used to match packet headers for packets routed by the virtual switch.

25. An apparatus comprising:
means for determining, during a first time interval, a first cache miss ratio for a cache arranged to store information used by processing logic hosted by a computing platform;
means for determining, during a second time interval, a second cache miss ratio for the cache; and
means for comparing the first cache miss ratio to the second cache miss ratio to determine whether to adjust a cache insertion ratio used for the second time interval for use during a subsequent time interval, the cache insertion ratio based on a ratio of cache misses to cache insertions.

26. The apparatus of claim 25, comprising:
means for adjusting the cache insertion ratio used for the second time interval to cause a reduction in the cache insertion ratio for use during the subsequent time interval based on the first cache miss ratio being equal to the second cache miss ratio.

27. The apparatus of claim 25, comprising:
means for adjusting the cache insertion ratio used for the second time interval to cause an increase in the cache insertion ratio for use during the subsequent time interval based on the first cache miss ratio being lower than the second cache miss ratio.

28. The apparatus of claim 25, comprising:
means for adjusting the cache insertion ratio used for the second time interval to cause an increase in the cache insertion ratio for use during the subsequent time interval based on the first cache miss ratio being higher than the second cache miss ratio and a previous adjustment to the cache insertion ratio used for the second time interval resulted in an increase in a cache insertion ratio for use during the second time interval.

29. The apparatus of claim 25, comprising:
means for adjusting the cache insertion ratio used for the second time interval to cause a decrease in the cache insertion ratio for use during the subsequent time interval based on the first cache miss ratio being higher than the second cache miss ratio and a previous adjustment to the cache insertion ratio used for the second time interval resulted in a decrease in a cache insertion ratio for use during the second time interval.

\* \* \* \* \*